US009104680B2

(12) United States Patent
Vanderhallen et al.

(10) Patent No.: US 9,104,680 B2
(45) Date of Patent: Aug. 11, 2015

(54) METHOD FOR ACCESSING FILES OF A FILE SYSTEM ACCORDING TO METADATA AND DEVICE IMPLEMENTING THE METHOD

(75) Inventors: Frank Vanderhallen, Edegam (BE); Lieven Gesquiere, Edegem (BE); Bram Stes, Edegem (BE)

(73) Assignee: Thomson Licensing, Boulogne, Billancourt (FR)

(*) Notice: Subject to any disclaimer, the term of this patent is extended or adjusted under 35 U.S.C. 154(b) by 0 days.

(21) Appl. No.: 13/381,749

(22) PCT Filed: Jun. 23, 2010

(86) PCT No.: PCT/EP2010/058871
§ 371 (c)(1),
(2), (4) Date: Dec. 30, 2011

(87) PCT Pub. No.: WO2011/000745
PCT Pub. Date: Jan. 6, 2011

(65) Prior Publication Data
US 2012/0109983 A1    May 3, 2012

(30) Foreign Application Priority Data
Jul. 1, 2009   (EP) .................................... 09447028

(51) Int. Cl.
*G06F 17/30* (2006.01)
(52) U.S. Cl.
CPC .................. *G06F 17/301* (2013.01)

(58) Field of Classification Search
CPC ....................................................... G06F 17/301
USPC ................... 707/752, 829, 758, 959
See application file for complete search history.

(56) References Cited

U.S. PATENT DOCUMENTS

| 5,440,400 | A | 8/1995 | Micheron et al. |
| 7,487,228 | B1* | 2/2009 | Preslan et al. ............... 709/219 |
| 7,904,466 | B1* | 3/2011 | Valencia et al. .............. 707/758 |
| 7,953,879 | B1* | 5/2011 | Nagaralu et al. ............. 709/231 |
| 8,280,895 | B2* | 10/2012 | Peckham et al. ............. 707/752 |
| 8,301,602 | B1* | 10/2012 | Jiang et al. ................... 707/649 |
| 8,417,746 | B1* | 4/2013 | Gillett et al. ................. 707/829 |
| 2002/0138502 | A1* | 9/2002 | Gupta ........................... 707/200 |
| 2003/0158836 | A1* | 8/2003 | Venkatesh et al. ................ 707/1 |

(Continued)

FOREIGN PATENT DOCUMENTS

| CN | 101079902 | 11/2007 |
| EP | 0899667 | 3/1999 |

(Continued)

OTHER PUBLICATIONS

S. Ames etal: "LiFS: An Attribute-Rich File System for Storage Class Memories" 23rd IEEE, 14th NASA Goddard Conf., May 2006, pp. 1-14.

(Continued)

*Primary Examiner* — Sheree Brown
(74) *Attorney, Agent, or Firm* — Jeffrey D. Carter (57) ABSTRACT

The invention relates to the field of accessing data stored in a file system and more particularly, to the optimization of accessing data of a file system. To this effect, the invention proposes a method of accessing files of a data file system according metadata related to the files, and a device for implementing the method.

20 Claims, 6 Drawing Sheets

(56) References Cited

U.S. PATENT DOCUMENTS

| | | | |
|---|---|---|---|
| 2004/0044706 A1 | 3/2004 | Cohen et al. | |
| 2004/0098424 A1 | 5/2004 | Seidenberg et al. | |
| 2005/0246637 A1 | 11/2005 | Seshadri et al. | |
| 2005/0289111 A1 | 12/2005 | Arrouye et al. | |
| 2006/0206533 A1 | 9/2006 | Cheng et al. | |
| 2006/0230076 A1 | 10/2006 | Gounares et al. | |
| 2006/0288034 A1 | 12/2006 | Do et al. | |
| 2009/0119304 A1 | 5/2009 | Preslan et al. | |
| 2010/0082547 A1* | 4/2010 | Mace et al. | 707/648 |
| 2010/0088317 A1* | 4/2010 | Bone et al. | 707/737 |
| 2010/0169393 A1* | 7/2010 | Fruchter et al. | 707/828 |
| 2010/0318590 A1* | 12/2010 | Goldsmith et al. | 707/959 |
| 2010/0325181 A1* | 12/2010 | Skillcorn | 707/829 |
| 2011/0004601 A1* | 1/2011 | Peckham et al. | 707/752 |
| 2011/0113035 A1* | 5/2011 | Manjunath et al. | 707/741 |
| 2011/0145242 A1* | 6/2011 | Mehrotra et al. | 707/737 |

FOREIGN PATENT DOCUMENTS

| | | |
|---|---|---|
| EP | 1122647 | 8/2001 |
| JP | 2001229056 | 8/2001 |
| JP | 2008515048 | 5/2008 |
| JP | 2008269198 | 11/2008 |
| KR | 20020017077 | 3/2002 |
| WO | WO0160061 | 8/2001 |
| WO | WO0203644 | 1/2002 |
| WO | WO2004008348 | 1/2004 |
| WO | WO2006036290 | 4/2006 |

OTHER PUBLICATIONS

A. Hilliger von Thile etal: "Smart-Files: Combining the Advantages of DBMS and WfMS with the Simplicity and Flexibility of Spreadsheets" Mar. 2, 2005,pp. 175-184.

E.S. Cohen etal: "Version management in Gypsy", Software Engineering Notes, vol. 13, No. 5, Nov. 1, 1988, pp. 201-215.

Search Report Dated Jul. 22, 2010.

Ishikawa et al. "Proposal of an integrated document space management system", DBSJ Letters, vol. 5, No. 2, Sep. 21, 2006, pp. 89-92. English Abstract.

Mitsumori et al., "Proposal of Middleware for metadata-powered advanced file operations", IEICE Technical Report, vol. 107, No. 131, (2007), pp. 189-194. English Abstract.

Bunton et al., "Metaview dynamic metadata based views of user files", Proceedings of the 13th Australasian Document Computing Symposium, Hobart, Australia, Dec. 8, 2008, pp. 11-18.

Douceur et al., "Distributed directory service in the farsite file system", 7th USENIX Symposium on Operating Systems Design and Implementation, Seattle, Washington, USA, Nov. 6, 2006, pp. 321-334.

Zhan et al., "Metadata management for distributed multimedia storage system", International Symposium on Electronic Commerce and Security, 2008, pp. 443-447.

Blas et al., "View based collective I/O for MPI-IO", 8th international symposium on cluster computing and the grid (CCGRID '08), Lyon, France, May 19, 2008, pp. 409-416.

Huang et al., "Building a portable file system for heterogeneous clusters" Tsinghua science and technology, vol. 10, No. 1, Feb. 2005, pp. 108-114.

* cited by examiner

METHOD FOR ACCESSING FILES OF A FILE SYSTEM ACCORDING TO METADATA AND DEVICE IMPLEMENTING THE METHOD

This application claims the benefit, under 35 U.S.C. §365 of International Application PCT/EP2010/058871, filed Jun. 23, 2010, which was published in accordance with PCT Article 21(2) on Jan. 6, 2011 in English and which claims the benefit of European patent application No. 09447028.3, filed Jul. 1, 2009.

1. FIELD OF INVENTION

The invention relates to the field of accessing data stored in a file system and more particularly to the optimization accessing of data in a file system.

2. TECHNICAL BACKGROUND

According to prior art, data files comprise audio, video, audio and video, still images, text, interactive programs, etc. These data files are stored in hierarchically organized data file systems, organizing the data files in directories and subdirectories. In large data file systems comprising thousands of files, a huge number of files exist, containing a vast amount of data, and a large data file system quickly becomes difficult to manage. A way of managing the huge amount of files and data in large data file systems is by means of metadata. Metadata is data about data. Examples of metadata are: file name, file type, file length, creation date, but also author, keywords in a text document, album name of an image, etc. Metadata thus gives information on one or more file(s) stored in the data file system. In such, metadata can help user(s) or application(s) to find their way in a data file system and to access it. When metadata is used for accessing files of a data file system, metadata is extracted and index data is created that relates extracted metadata to files of the data file system. This index data is then stored for later use. The index data allows fast lookup of files based on metadata. The process of creation of index data is also called indexing of a data file system. Indexing thus is the process of scanning a data file system in order to extract metadata and the relation of the metadata with the files of the data file system and to store the metadata and the relation of the metadata to the files of the data file system for use by a user and/or application. From a large data file system important amounts of metadata and file relational data are extracted. Extracting metadata and creation of index data is not sufficient for easing the management of a large data file system. Current tendency to interconnect devices with each a separate data file system in a network adds to the complexity of the management of the files stored on these devices. Shared network storage devices then offer the advantage of allowing centralized storage of content shared between devices connected into a network, for example organized in a LAN (Local Area Network).

According to prior art, devices of such a network each have their own indexing system. This implicates that each client does its own data file system scanning and its own metadata and index storing. Then, index data and metadata can not be shared among clients of such a network. This is a waste of resources in terms of storage and processing needs.

According to prior art, the creation of user- and/or application defined metadata is limited to metadata proposed by applications managing the metadata, thereby limiting the power of the management of the data file system for users and/or applications.

According to prior art, metadata is accessed via a dedicated API (Application Programming Interface), thereby restricting access to metadata and thus the access to files of the data file system according to metadata to applications implementing the dedicated API.

According to prior art, there is no way to organize the layout of a data file system according to related metadata.

Thus, the prior art does not allow an optimized access to files of a file system according to metadata.

3. SUMMARY OF THE INVENTION

The present invention aims at alleviating some of the inconveniences of prior art.

More precisely, the invention allows optimized access to files in a file system according to metadata through a so-called MVFS (Metadata-View File System) that allows accessing files of a file system according to metadata related to these files.

In order to optimize the access to files in a file system hereafter referred to as 'data file system', the invention internally stores index data and metadata for 'private' access by the MVFS in a database, and presents the internally stored metadata 'publicly' to users and/or applications as a metadata file system, hereafter referred to as 'metadata file system'. To help users and/or applications to browse their way through huge amounts of metadata, the structure of the metadata file system reflects the structure of the file system to which it relates. In addition, the metadata file system and the metadata itself can be accessed by users and/or applications using normal file system access methods. In order to further optimize the access to files in a data file system, users and/or applications can organize the data in the data file system by specific metadata, via so-called views. An example of a view is a view based on metadata attribute 'type of file' and further refined on metadata attribute value 'type of file=music file'. The example view thus allows a user or an application to list all music files in the data file system. In order to save storage space and also for reasons of coherence, a view does not directly contain the files that correspond to the view, but the view merely comprises pointers to these files. These pointers can be implemented with symbolic links. Using pointers to files, no file copy is needed, and in addition a same file can be pointed to by multiple views without file duplication. The contents of a view, that is the list of pointers to files of the data file system can be specified in a view configuration by a user and/or application according to metadata selection criteria. As is the case for metadata, which is presented to users and/or applications as being part of the metadata file system, views and view configurations are presented to users and/or applications in a view file system, hereafter also referred to as 'view file system', thereby giving users and/or applications access to the views and view configurations through 'normal' file system access methods. As for the metadata, view configurations are stored internally in a database by the MVFS for 'private' use, and for each internally stored view configuration a 'public' version exists that can be modified by users and/or applications.

In order to optimize access to files of a file system according to metadata, the invention proposes a method of accessing files of a data file system according metadata related to the files, the method being implemented by a file management device, the method being characterized in that the metadata is represented to at least one client device as being stored in a metadata file system, where the metadata file system is organized according to a structure of the data file system, at least one first file in the data file system being represented as at least one first directory in the metadata file system, and at least one metadata attribute related to the at least one first file in the data file system, being represented as at least one second file in the metadata file system, and at least one value of the at least one metadata attribute being represented as being stored in the at least one second file and a view file system organizing files of the data file system according to metadata related to the files in at least one second directory, which directory comprises as content at least one pointer to at least one of the first file in the data file system, the content being determined according to at least one metadata selection criterion, the method further comprising a step of accessing the files of the data file system using the metadata and the view file system, the metadata file system and the view file system as well as the metadata being accessed with access methods used for accessing the data file system, and the data file system, the metadata file system and the view file system being mounted on a same root file system level.

According to a variant of the method of accessing files of a data file system according metadata related to these files, the metadata file system (32) and the view file system are accessible to the at least one client device using a same set of file system access methods as those needed to access the data file system.

According to a variant of the method of accessing files of a data file system according metadata related to these files, the at least one metadata selection criterion is comprised in at least one configuration file that is accessible to the at least one client device in the view file system in a subdirectory of which the name identifies the at least one metadata selection criterion.

According to a variant of the method of accessing files of a data file system according metadata related to these files, the at least one configuration file comprises a metadata selection criterion that is represented by a metadata attribute and a metadata attribute value.

According to a variant of the method of accessing files of a data file system according metadata related to these files, the at least one configuration file comprises a metadata sorting criterion that is represented by a metadata attribute.

The invention also proposes a device for accessing files of a data file system according to metadata related to the files, the device being characterized in that it represents the metadata to at least one client device as being stored in a metadata file system, where the metadata file system is organized according to a structure of the data file system, the device comprising:

means for giving access to the metadata via the metadata file system where at least one first file in the data file system is represented as at least one first directory in the metadata file system, and where at least one metadata attribute related to the at least one first file in the data file system, is represented as at least one second file in the metadata file system, and where at least one value of the at least one metadata attribute is represented as being stored in the at least one second file and means for giving access to the files of the data file system via a view file system organizing files of the data file system according to metadata related to the files in at least one second directory, which directory comprises as content at least one pointer to at least one of the first file in the data file system, the content being determined according to at least one metadata selection criterion the metadata file system and the view file system as well as the metadata being accessed with access methods used for accessing the data file system, and the data file system, the metadata file system and the view file system being mounted on a same root file system level.

According to a variant of the device for accessing files of a data file system according to metadata related to the files, the device further comprises a database comprising data used by the means for giving access to the metadata and used by the means for giving access to the files of the view file system.

4. LIST OF FIGURES

More advantages of the invention will appear through the description of particular, non-restricting embodiments of the invention. The embodiments will be described with reference to the following figures.

5. DETAILED DESCRIPTION OF THE INVENTION

Figure 1:
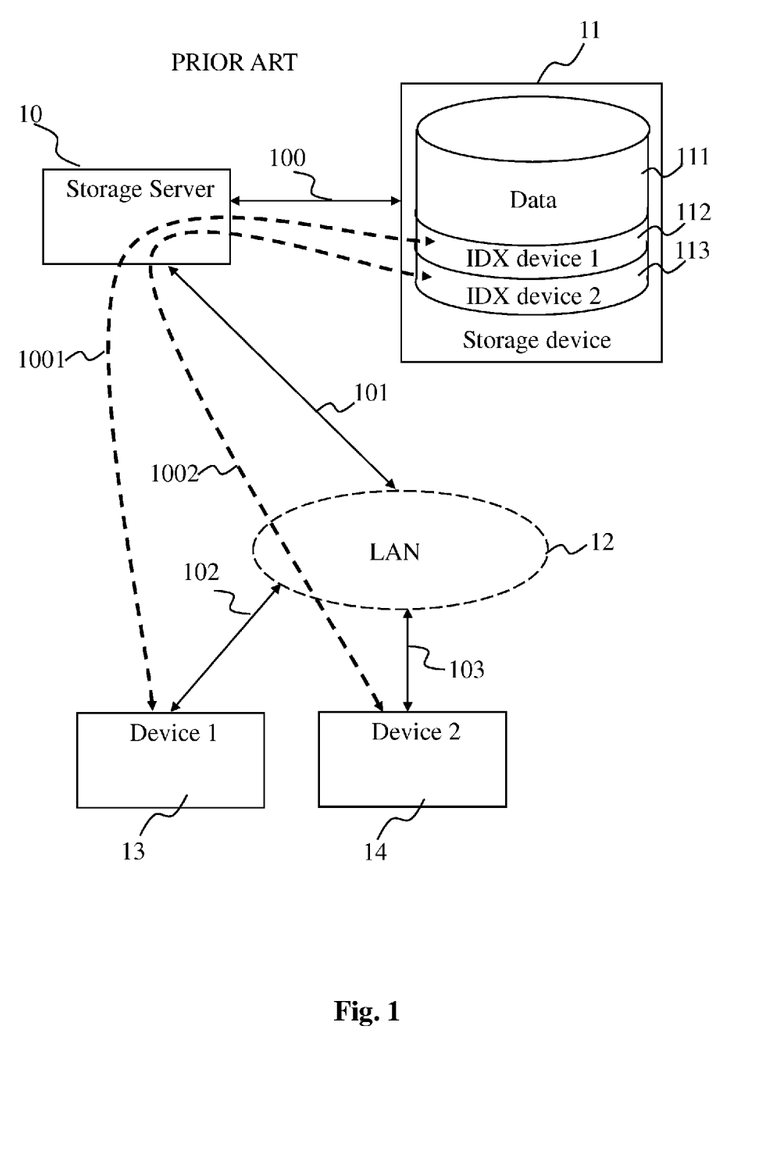
FIG. 1 shows an example network infrastructure for prior art access to files in a data file system according to related metadata by devices connected into a local network.

FIG. 1 shows an example network infrastructure for prior art method of access to files in a data file system according to related metadata by devices connected into a local network.

The infrastructure comprises:

a storage server 10;

a storage device 11;

a first device 13;

a second device 14; and a local area network 12.

The devices 13, 14, as well as storage server 10 are connected to the LAN 12 via respectively bidirectional connections 102, 103 and 101. Storage server 10 is connected to storage device 11 via bidirectional connection 100. Storage device 11 comprises data 111 organized in a data file system and extracted metadata+index data on metadata 112 and 113. Bidirectional dotted arrows 1001 and 1002 indicate data- and control flows respectively from device 13 to extracted metadata+index data on metadata 112 and vice versa and from device 14 to index data 113 and vice versa.

Device 13 and device 14 each have their own extracted metadata and index data on storage space on storage device 11. Extraction of metadata and generation of index data is done by device 13 over data 111 and is stored in storage space 112. Extraction of metadata and generation of index data is done by device 14 over data 111 and is stored in storage space 113. None of the devices 13 and 14 share extracted metadata and index data, which is particular inefficient in terms of storage space, because a large part of information is duplicated, which also reduces the storage space available for data 111. It is also particularly inefficient in terms of processing needs. This is because each device has to do its own extraction of metadata and generation of index data. Then, when a change is made to the data 111, this change is to be reflected in each metadata/index data. This results in addition in synchronization problems of how a change can quickly be reflected in each metadata/index data. In addition, a single change creates several read/write accesses to storage device 11, to update each of the metadata/index data. In addition, the metadata/index data not being shared between devices 13 and 14, each of the devices 13 and 14 can not benefit from an extraction of metadata and generation of index data being already done by one of the other devices 13 or 14.

The above discussed prior art implementation is an example prior art implementation. Other prior art implementations are possible, such as a single device integrated with a storage device on which a data file system and an index- and metadata are stored.

Figure 2:
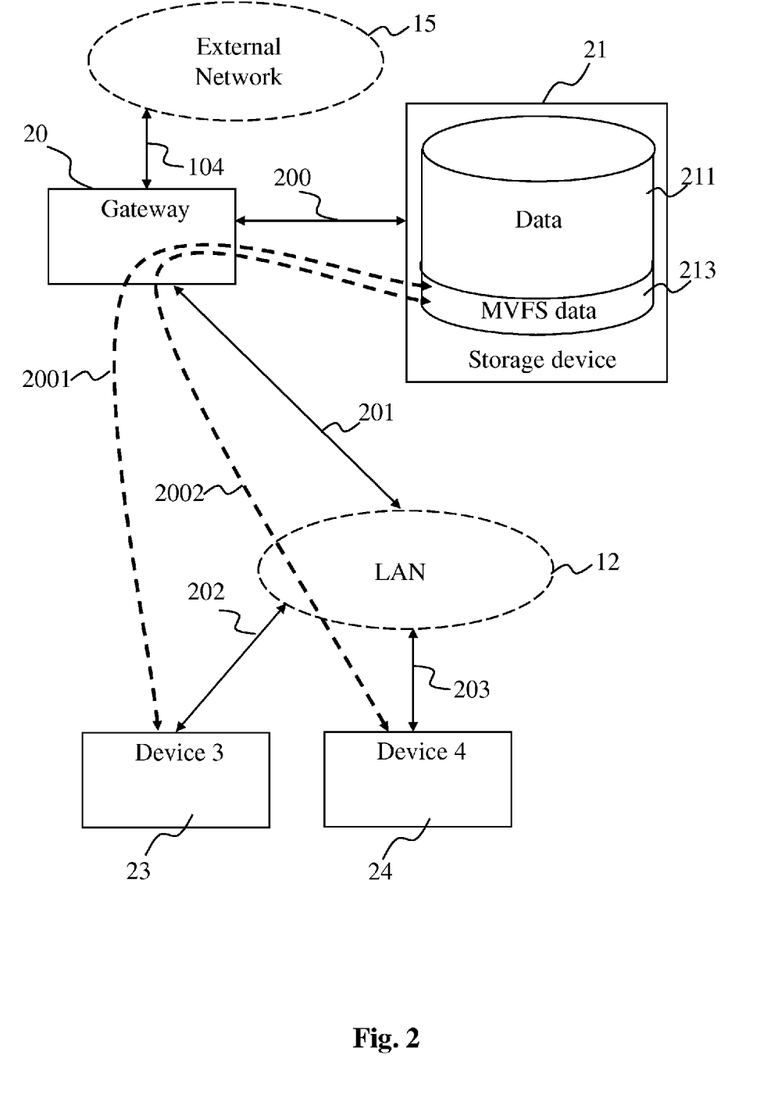
FIG. 2 shows an example embodiment of the invention in a network infrastructure that is compatible with the invention and that includes several devices connected into a local network.

FIG. 2 shows example embodiment of the invention in a network infrastructure that is compatible with the invention.

The infrastructure comprises:
gateway 20;
storage device 21;
a first device 23;
a second device 24;
a local area network 12; and
an external network 15.

The devices 23, 24, as well as gateway 20 are connected to the LAN 12 via respectively bidirectional connections 202, 203 and 201. Device 20 is connected to storage device 21 via bidirectional connection 200. Storage device 21 comprises data 211 and extracted metadata+generated index data+generated views indicated by "MVFS data" 213. Bidirectional dotted arrows 2001 and 2002 indicate data- and control flows respectively from client device 23 to extracted metadata+index data+generated views 213 and vice versa and from client device 24 to the same extracted metadata+generated index data+generated views 213 and vice versa. Device 20 is further connected to external network 15 via bidirectional link 104, which gives client devices 23 and 24 access to additional services and/or storage provided by devices (not shown) connected to the external network 15.

In contrast with the prior art of FIG. 1, client devices 23 and 24 of FIG. 2 share storage space 213 on storage device 21.

The extraction of metadata, the generation of index data from data 211, presentation of metadata file system and view file system is done by file management device 20, which has the advantage of being an 'always on' device, that can do the extraction of metadata and generation of index data at any time when its resources are available, for example during nighttime when there is no or little activity of client devices 23 and 24.

According to a variant embodiment of the invention, the extraction of metadata and generation of index data is indifferently done by one of the devices 20, 23 or 24, according to availability of resources of these devices. This variant embodiment has the advantage to distribute the resources necessary to extract metadata and to generate index data according to the availability of the resources of each device 20, 23 or 24, and thus reduces the processing needs of each of these devices.

The client devices 23 and 24 share extracted metadata and generated index data, which is particular efficient in terms of storage space: no information is duplicated for each client device and thus more space is available on storage device 21 for data 211 when compared to prior art, and which is also efficient in terms of processing needs: when a change is made to data 211, this change is to be reflected in only one metadata/index data storage 213, which avoids synchronization problems and which limits the number of read/write accesses needed to update the metadata/index data stored on storage device 21. In addition, the metadata/index data being shared between client devices 23 and 24, the client devices 23 and 24 can benefit of an extraction of metadata/generation of index data being already done by the file management device 20, or according to a variant embodiment of the invention, by one of the client devices 23 and 24.

According to a particular embodiment of the invention, the client devices 23 and 24 are digital Set Top Box receivers for reception of digital television and radio programs.

According to a particular embodiment of the invention, the client devices 23 and 24 are devices that render digital video and/or audio content such as devices with MP3 audio player or H.264 video player capacity.

According to a particular embodiment of the invention, the client devices 23 and 24 are wireless devices connected to file management device 20 via a wireless connection.

Figure 3:
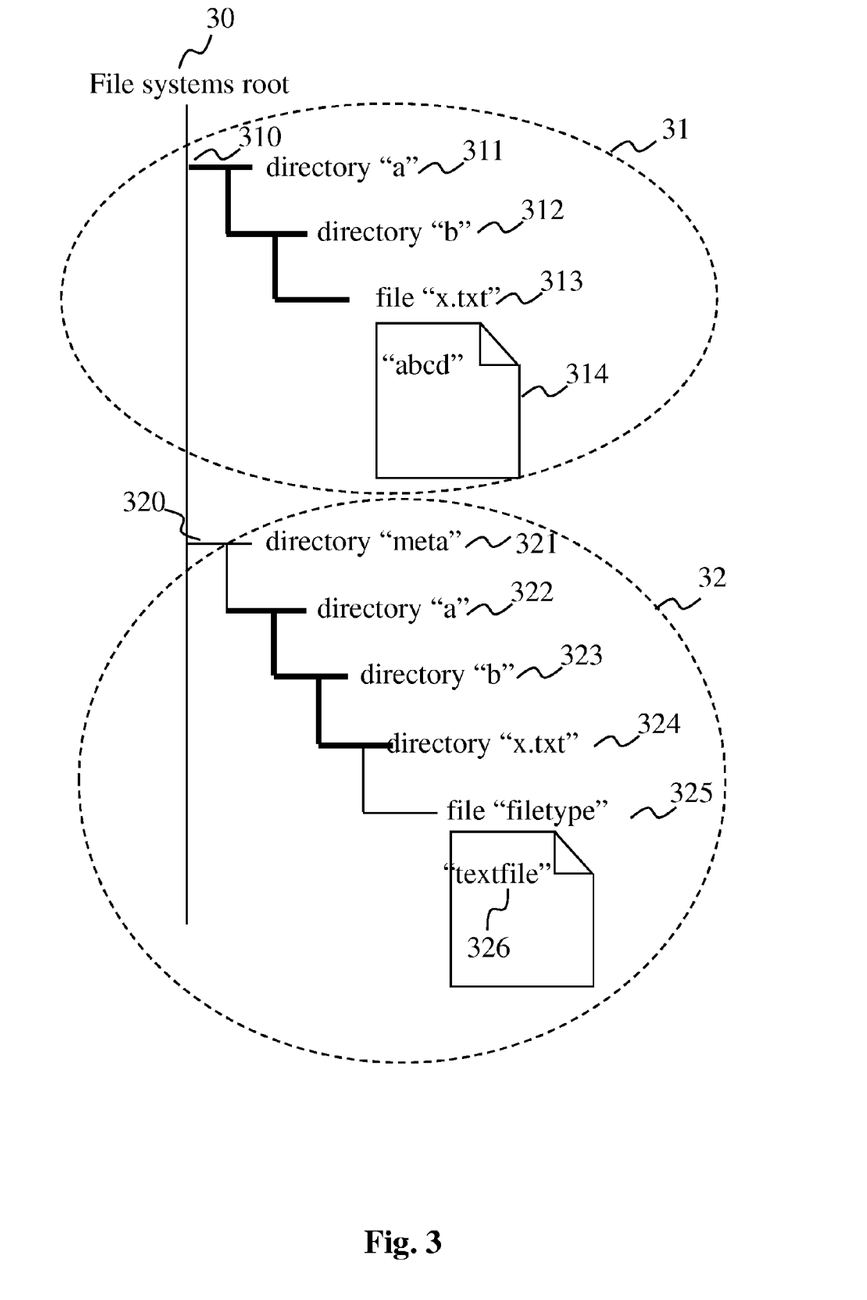
FIG. 3 shows how metadata is presented as a file system according to a particular embodiment of the invention.

FIG. 3 shows how metadata is presented in a file system 32 according to a particular embodiment of the invention.

Vertical bar 30 represents the root of the data file system 31. The metadata file system 32 is constructed by the MVFS from internally stored index data and metadata and is presented to users and/or applications as a file system that is mounted on the root. The data file system 31 can for example be stored on storage device 21 of FIG. 2 and is managed by device 20 of FIG. 2.

Data file system 31 is organized in a hierarchical manner, with a directory 'a' 311, directly under the file system root 30, and a subdirectory 'b' 312 of directory 'a' 311, and a file 'x.txt' 313 in the subdirectory 'b' 312. File x.txt is further illustrated by 314 and comprises textual content 'abcd'.

The metadata file system 32 has a directory 'meta' 321 directly under the file systems root 30. Directory 'meta' has a subdirectory 'a' 322 and subdirectory 'a' has a subdirectory 'b' 323, which in turn has a subdirectory 'x.txt' 324.

Metadata file system 32 is thus organized according to the structure of data file system 31, whereby each file in data file system 31 is represented by a directory in the metadata file system 32, where the name of that directory identifies the file.

Directory 'a' 322 of the metadata file system 32 corresponds to directory 'a' 311 of the data file system 31. Subdirectory 'b' of the metadata file system 32 corresponds to subdirectory 'b' 312 of data file system 31. Subdirectory 'x.txt' 324 of meta-data file system 32 corresponds to file 'x.txt' 313 of data file system 31.

In this metadata file system 32, a metadata attribute related to a file in the data file system is represented as one or more files in directories of the metadata file system. For example, file 'x.txt' 313 of the data file system 31 has related metadata 'filetype', which metadata is thus represented by file 'filetype' 325 in directory 'x.txt' 324 of the metadata file system 32. Thus, a file in the metadata file system 32 represents a metadata attribute.

In this metadata file system 32, a metadata attribute value related to a file in the data file system 31 is represented as a value in a metadata file. For example, the metadata value of metadata attribute 'filetype' for file 'x.txt' 313 is 'textfile'. Thus, the metadata value of metadata attribute 'filetype' is represented as textual content 'textfile' of file 'filetype' 325 under directory 'x.txt' of the metadata file system, illustrated by 326 in FIG. 3.

This way, the metadata file system 32 is represented to a user and/or application as a standard hierarchical file system, and accessing the metadata file system 32 for a user and/or application requires no other access methods than access methods to access data file system 31, such as changing of directory, listing the contents of a directory, and reading the content of files.

According to a particular embodiment of the invention, users and/or applications are given unrestricted read/write access to the metadata file system 32. This allows users and/or applications a maximum level of power of expression with regard to the metadata file system 32.

According to yet another variant embodiment, the read/write access of users and/or applications is restricted per user and/or application, thereby allowing differentiation of access rights, for example an administrator of the metadata file systems can have unrestricted access rights, whereas a common user has access restricted to addition of metadata related to data in the data file system 31 that is owned by him.

Figure 4:
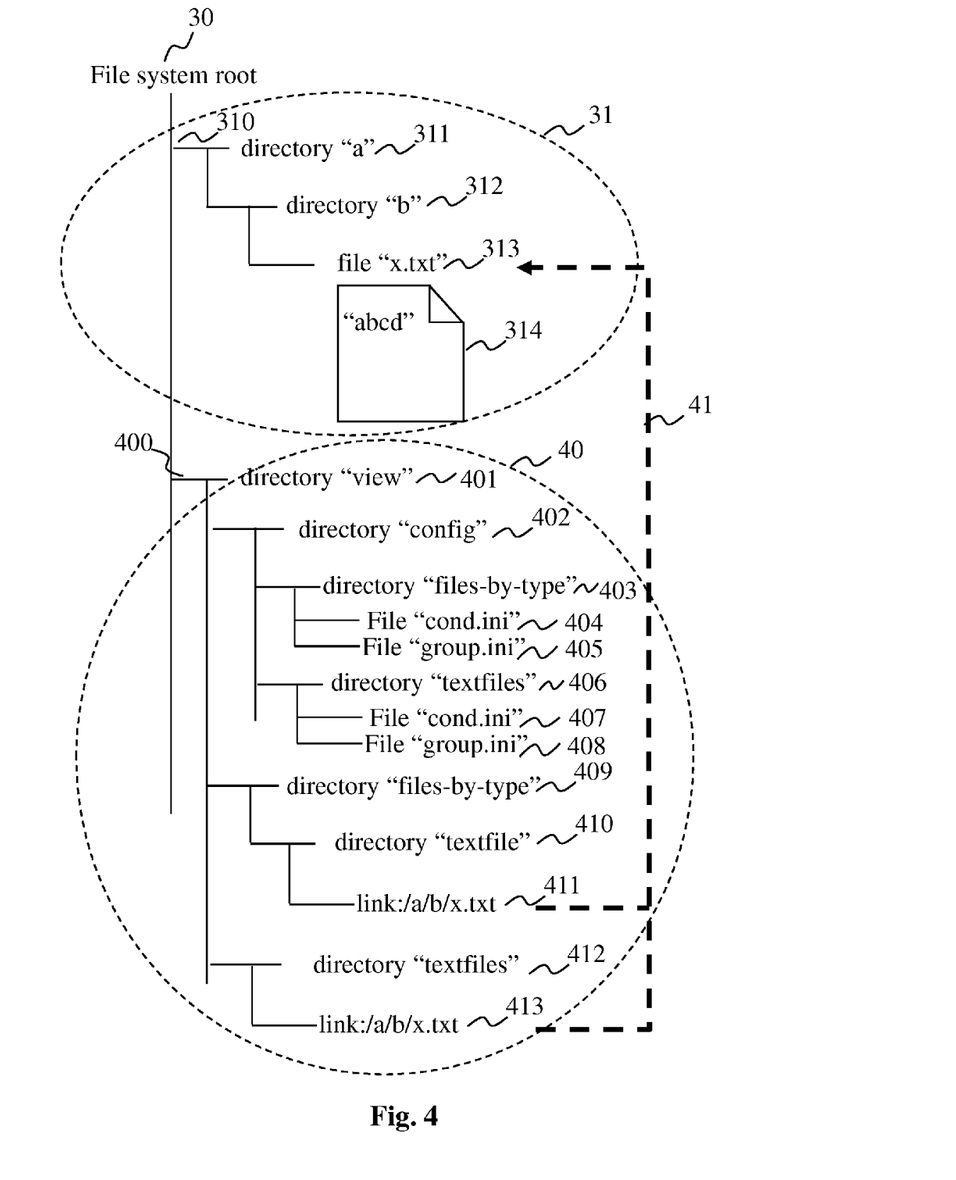
FIG. 4 shows how view data is presented as a file system according to a particular embodiment of the invention and how the view data is related to the data of the data file system.

FIG. 4 shows how views are created, presented and maintained in a view file system 40 of the MVFS and how views are related to data file system 31, according to a particular embodiment of the invention.

Data file system 31 from FIG. 3 is illustrated at the top of FIG. 4. Mounted on the file system root is view file system 40 that is constructed by the MVFS from internally stored view data.

This way, the view file system 40 is represented to a user and/or application as a standard hierarchical file system, and accessing the view file system 40 for a user and/or application requires no other access methods than access methods to access data file system 31, such as changing of directory, listing the contents of a directory, and reading the content of files.

The base directory of the view file system 40 is directory 'view' 401. Under directory 'view' 401 is a directory 'config' with two subdirectories, namely directory 'files-by-type' 403 and directory lextfiles' 406. Both of these directories have files 'cond.ini' and 'group.ini', respectively 404 and 405 for directory 'files-by-type' 403 and respectively 407 and 408 for directory 'textfiles' 406.

Directly under directory 'view' 401 is also a directory 'files-by-type' 409, with subdirectory 'textfile' 410. Subdirectory 'type-text' 410 comprises symbolic link 'a/b/x.txt' 411 that points to file 'x.txt' 313 of data file system 31, which is illustrated by dotted arrow 41.

Also directly under directory 'view' 401 is furthermore a directory 'textfiles' 412, which comprises link 'a/b/x.txt' that also points to file 'x.txt' 313 of file system 31, which is illustrated by dotted arrow 41.

The view file system 40 comprises a configuration part and a view part. The configuration part allows users and/or applications to specify the contents of a view and the configuration part is readable and writeable by a user and/or application. The view part is read-only for a user and/or application.

In this particular embodiment, the configuration part is illustrated by directory '.config' 402 and its subdirectories 403, respectively 406 and files 404, 405 respectively 407, 408. The view file system 40 further comprises a view part that is illustrated by directory 409 'files-by-type' with subdirectory 410 'textfile' and link 411 'a/b/x.txt' respectively by directory 412 'textfiles' and link 413 'a/b/x.txt'.

When a user and/or application wants a view of the files in the data file system 31 in which the files are organized according to metadata selection criterion 'metadata attribute=file type', the user and/or application creates a directory in the view file system 40 '/view/config/files-by-type' 403. Upon creation of this directory, the MVFS will create view configuration files in this directory, such as 'cond.ini' 404 and 'group.ini' 405. The contents of view configuration files 404 and 405 are writeable for a user and/or an application but these files can not be deleted by a user and/or an application. The file 'cond.ini' 404 allows a user and/or an application to specify a metadata selection criterion that is to be satisfied in order for any file links to appear in the view. If the file 'cond.ini' 404 is left empty, no file links will appear in the view. The file 'group.ini' 405 allows a user and/or an application to specify a grouping criterion for the links that appear in the view, according to which the links will be organized in subdirectories of the view. If left empty, no grouping will be done. After having created the /view/config/files-by-type directory 403, the user and/or application writes a metadata selection criterion 'file type=*' to file 'cond.ini' 404, meaning that any types of files of data file system 31 are to be presented in the view. In addition, if the user and/or application wants to organize the files presented in the view according to their file type, the user and/or application writes textual value 'type' to file 'group.ini' 405. The actions of the user and/or application will have as a result that the MVFS will create user and/or application readable directory 'files-by-type' 409, with a subdirectory per type of file present in the data file system 31. According to the example given here, there is only one type of file present in the data file system 31, namely of type 'textfile'. The MVFS thus creates a subdirectory 'textfile' 410. In each particular subdirectory per type of file, the MVFS then creates links to all the files that correspond to the specific file type. According to the example given here, there is only one file in the data file system that corresponds to file type 'textfile', namely file 'x.txt' 313. The MVFS thus creates link 'a/b/x.txt' 411 in subdirectory 'textfile' 410.

Now how does the MVFS find the files in the data file system 31 that correspond to a metadata search criterion? Using the above example, the MVFS thus needs to find all the files in data file system 31 that have a metadata attribute 'filetype' and organize them according to metadata attribute value. To do so, the MVFS uses internally stored meta- and index data to find the files in the data file system that correspond to the metadata search criterion. Thus the MVFS searches the meta- and index data for all metadata attributes 'filetype'. Each different file type found is then represented by subdirectories in the view file system. It then searches the meta- and index data for all specific file types found, and creates a pointer to that file in the view file system 40 in the subdirectory corresponding to the specific file type, such as subdirectory 'textfile' 410. Then it creates a pointer to each file that is indexed in the meta- and index database 505 that has the specific file type (=metadata attribute value having a specific value), the pointer being created from the path information that is stored in the meta- and index data.

As a second example, suppose that a user and/or application wants to create a view of the data file system 31 of all files in the data file system 31 that have metadata attribute 'filetype' with value 'textfile'. For this purpose, the user and/or application creates a directory '/view/config/textfiles' 412 in view file system 40, upon which the MVFS automatically creates files 'cond.ini' 407 and 'group.ini' 408. Then the user and/or application writes metadata search criterion 'file type=textfile" to the automatically created 'cond.ini' file 407. This results in automatic creation, by the MVFS, of directory 'textfiles' 412 of link 'a/b/x.txt' 413 pointing to file 'x.txt' 313.

The above described embodiments are given as an example illustrating the invention.

According to a particular embodiment of the invention, additional view configuration files are created by the MVFS upon creation of a view by a user and/or application, such as a view configuration file to specify an ordering criterion, such as ascending or descending alphabetical order, or ordering based on metadata attribute or metadata attribute value, such as file creation date or a specific value of a file creation date, or a specific range of file creation date.

The reader of the present document will understand that file system names, file directory names and file names have been chosen for illustrative purposes, and that other file system names, file directory names and file names are compatible with the invention.

Other types of syntax for specification of metadata selection criteria are possible and compatible with the invention. According to a particular embodiment, a version of XML (Extended Markup Language) is used to specify metadata search criteria. According to a particular embodiment, the XPath (XML Path) query language is used to specify metadata selection criteria.

According to a particular embodiment, an intermediate hard- or software module is provided for user and/or applications, which simplifies the operations for a user and/or application to create views. Such a module further has the advantage to hide the implementation specificities of the view file system. The module interfaces a user and/or application with the view file system and uses the standard file system access methods to access the view file system while hiding any complexity of the creation and management of views from to the user and/or application.

With respect to FIGS. 3 and 4, the following applies.

According to a particular embodiment of the invention, the internally stored metadata and/or view configuration data is stored in a relational database.

According to a variant embodiment, the internally stored meta- and index data and/or view configuration data is stored in hash tables. A hash table is a data structure that uses a so-called hash function to efficiently map data identifiers (keys) to data values. The hash function is used to transform the key to an index of an array element where data values are stored. Hash tables provide the advantage that a data lookup is independent of the number of elements stored in the table.

According to a particular embodiment of the invention, the MVFS keeps track of modifications made by users and/or applications to the data file system. It updates internally stored meta- and indexing data, its external representations, being the metadata file system and the view file system, accordingly to keep the external presentation of the data presented via the metadata and view file systems coherent with the internally stored data. Likewise, the MVFS keeps track of modifications by users and/or applications to the metadata file system and, if needed, updates indexing data and/or the view file system, which is for example needed when a user and/or application adds new metadata.

The metadata and/or the view file system are presented as a file system only when accessed by a user and/or an application. Thus, the metadata file system and/or the view file system are said to be virtual. This virtualization has the advantage to allow avoiding data duplication and thus avoids data incoherency. The metadata and/or view file systems are thus mere virtual presentations created from the internally stored data. All previously described operations done by a user and/or application on the metadata and/or view file system are then translated by the MVFS into read/write operations on the internally stored index data and metadata.

Figure 5:
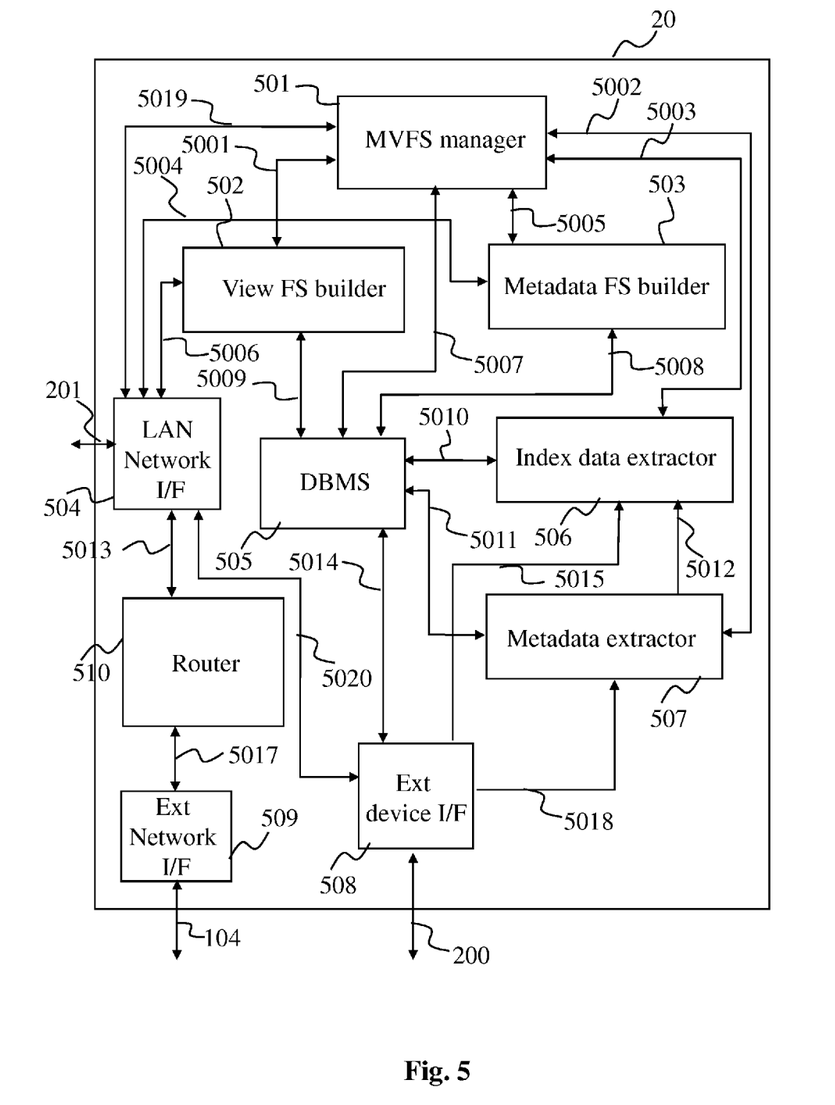
FIG. 5 shows a device implementing the invention, such as device 20 of FIG. 2, according a particular embodiment of the invention.

FIG. 5 shows a device implementing the invention, such as device 20 of FIG. 2, according a particular embodiment of the invention.

The device 20 comprises the following elements:
a router 510;
a local area network interface 504 for connection of the device 20 to a local network such as LAN 12 of FIG. 2, allowing the transmission and the reception of data and requests such as accesses to the three mentioned file systems from and to devices such devices 23 and 24 of FIG. 2;
a network interface 509, for connection of the device 20 to an external network such as network 15 of FIG. 2; and
an interface 508 for direct connection of an external device for storing of the data file system, the metadata file system and the view file system and index data and metadata from database 505, such as storage device 21 of FIG. 2;
an MVFS manager which handles accesses from devices relating to the file systems and which commands the functioning of elements 502-508;
a view file system builder 502, for building and maintaining the view file system;
a metadata file system builder 503, for building and maintaining the metadata file system;
a DBMS (Data base Management System) 505, for storing of index data, metadata and view configuration data;
an index data extractor 506, for extracting index data from a data file system; and
a metadata extractor 507, for extracting metadata from a data file system.

The elements of FIG. 5 are interconnected as follows.

MVFS manager 501 is connected to view file system builder 502 via bidirectional connection 5001, to metadata file system builder 503 via bidirectional connection 5005, to index data extractor 506 via bidirectional connection 5003 and to metadata extractor 507 via bidirectional connection 5002 allowing it to send data and commands to the mentioned elements 502, 503, 506 and 507 and to receive data and command acknowledgements from to the mentioned elements 502, 503, 506 and 507. MVFS manager 501 is further connected to DBMS 505 via bidirectional connection 5007, allowing it to store and retrieve data. DBMS is connected to external device interface 508 via bidirectional connection 5014, allowing it to save data from the database on external storage device 21 in storage space 213 and to retrieve it. MVFS manager 501 is also connected to LAN network interface 504 via bidirectional connection 5019 allowing it to exchange data, commands and command acknowledgements with the devices 23 and 24 connected to LAN 12.

View file system builder 502, metadata file system builder 503, index data extractor 506 and metadata extractor 507 are all connected to DBMS 505 via respectively bidirectional connections 5009, 5008, 5010 and 5011, allowing these elements to store and retrieve data.

View file system builder 502 and metadata file system builder 503 are further connected to LAN network interface 504 via respectively bidirectional connection 5006 and 5004, allowing these elements to exchange data with the devices 23 and 24 connected to the LAN 12.

Index data extractor 506 and metadata extractor 507 are connected to external device interface 508 via respectively connections 5015 and 5018, allowing them to access the data stored in the data file system 31, which is stored on external storage device 21. Metadata extractor 507 and Index data extractor 506 are interconnected via bidirectional connection 5012, allowing them to communicate in the process of extracting meta- and index data.

Users and/or applications have read/write access to the data file system that is stored on external storage device 21 via LAN network interface 504 and External device interface 508, that are interconnected via bidirectional connection 5020.

As device 20 is also a router for routing packets between devices 23 and/or 24 connected to LAN 12, between devices in the external network 15 and in LAN 12, the device 20 comprises a router element 510 that interconnects LAN network interface 504 with external network interface 509 via respectively bidirectional connections 5013 and 5017.

Finally, device 20 is connected to LAN 12 via bidirectional connection 201, to external network 15 via bidirectional connection 104 and to external storage device 21 via bidirectional connection 200.

These elements work together as follows to implement the invention. Metadata extractor 507 and index data extractor 506 extract metadata and index data from a data file system stored on external device 21 that they access via external device interface 508 and connections 5018 respectively 5015. The data that they extract is stored in DBMS 505, and the data to be stored is transferred from metadata extractor 507 and index data extractor 506 via connections 5011, respectively 5010 to DBMS 505. DBMS 505 stores new data or updates existing data in its internal database according to the commands and data that it receives from metadata extractor 5011 and from index data extractor 5010. DBMS manages the storage of the database on storage device 21, and so ensures that the data in the database is protected from accidental erasure, for example caused by a power surge. Once the metadata and index data are stored by the DBMS, the metadata data extractor 507 and the index extractor 506 inform MVFS manager 501 of the completion, via respectively connections 5002 and 5003. The MVFS manager 501 then instructs metadata file system builder 503 via connection 5005 to build the metadata file system based on the information stored in the database. For this purpose, the metadata file system builder reads the data stored in the database by the DBMS 505, via connection 5008. When the metadata file system builder has finished building the metadata file system, which comprises storing of data of the metadata file system as it is built in the database managed by the DBMS 505, the metadata file system builder 503 communicates to the MVFS manager 501 via connection 5005 that the metadata file system has been built and is ready to be used. The device 20 is now ready to receive instructions and requests related to accessing of data in the data file system according to related metadata from devices 23 and/or 24 connected to LAN 12. Devices 23 and/or 24 directly access the metadata file system via metadata file system builder 503 through LAN network interface 504 via connection 5004.

Modifications on metadata and on data of the data file system 31, for example done by devices 23 and/or 24 of LAN 12, are monitored by metadata and index data extractors 507 and 508, that communicate with the DBMS 505 to update its database accordingly.

When device 23 and/or 24 send instructions to MVFS manager 501 related to the configuration and accessing of views, the MVFS manager 501 instructs the view file system builder to configure and present a view according to the received instructions. View file system builder 502 stores view configurations in the database by accessing the DBMS via connection 5009. Once a view is configured, view file system builder directly interfaces with devices 23 and/or 24 to reply to read requests on the view, via connection 5006 that connects view file system builder 502 to LAN interface 504.

The functioning as described above is 'from scratch' that is, no metadata and index data is extracted yet, the database is not filled yet, and the metadata file system is not built. The reader will understand that once these actions are performed, they need not to be repeated upon each powering on of the device 20, because the DBMS stores the information that is needed to allow a quick startup by filling the database with already stored data saved on external storage device 21. For a nominal functioning, i.e. when the database managed by DBMS 505 is already filled, the MVFS manager 501 only needs to update existing data and send the right instructions to the elements 502-507 to execute that task. Time-consuming functions such as extracting meta- and index data can be given a low-priority so that the execution of these functions do not perturb the other functions of device 20. These low-priority tasks can then be executed in process background, for example during idle time, or can programmed to be executed over nighttime, or in a standby state, or only when data is modified that concerns meta- and index data, or only when a certain amount of data is modified.

Of course, the embodiment of FIG. 5 is an example embodiment illustrating a particular embodiment of the invention. The reader of this document will understand that the invention can be implemented in various different embodiments. For example, device 20 is not necessarily a gateway implementing a router and interfacing devices 23 and/or 24 with an external network, but a centralized server in a LAN that implements the method of the invention. Likewise, the invention can be implemented in any device of a LAN having the needed processing power to implement the method of the invention as an algorithm executed on a processor, or equipped with the necessary dedicated hardware to implement the invention, such as some or all of the elements described in FIG. 5. The reader will also understand that the invention can be implemented as described by a device connected to a wired network such as LAN 12, but also on any type of wireless networks. The reader will further understand that the device implementing the invention is needs not necessary to be equipped with an external disk such as depicted in FIG. 2, and that other variant embodiments are compatible with the invention, such as diskless implementations with non-volatile types of memory, or integrated disk storage in device 20, or external networked storage disk directly connected to network LAN 12.

According to a particular embodiment, the invention is entirely implemented in hardware, for example as a dedicated component (for example as an ASIC, FPGA or VLSI) (respectively « Application Specific Integrated Circuit», « Field-Programmable Gate Array» and « Very Large Scale Integration» ) or as distinct electronic components integrated in a device or in a form of a mix of hardware and software.

According to a particular embodiment, a device implementing the method of the invention is a personal computer, equipped or not with dedicated hardware.

According to a particular embodiment, the elements that are needed for the implementation of the functions according to the invention, such as the elements of the particular embodiment of FIG. 5, are distributed over several devices connected in a network, such as multiple set top boxes boxes or multiple gateways or a mix of these, each of these devices communicating with each other over the network in order to implement the invention as one virtual device. Such an embodiment of the invention can be useful for example to avoid using a centralized server or a gateway, through using processing capabilities of existing equipment.

Figure 6:
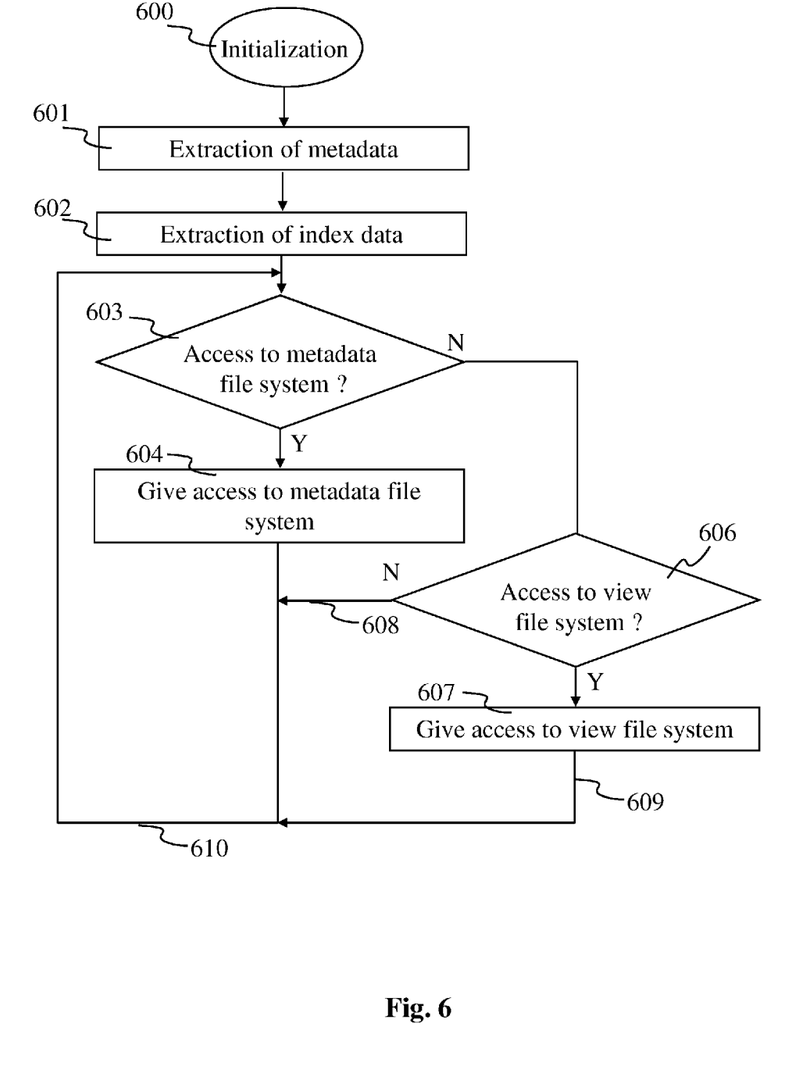
FIG. 6 shows an algorithm of accessing files of a data file system according to related metadata, implemented for example by device 20 of FIG. 2 according to a particular embodiment of the invention.

FIG. 6 shows an algorithm of accessing files of a data file system according to related metadata, implemented for example by device 20 of FIG. 2 according to a particular embodiment of the invention.

The algorithm starts with a step 600 of initialization of variables needed for its execution. Then, in a step 601, metadata is extracted from the data file system 31, for example using metadata extractor 507 of FIG. 5 and stored in a database, for example database 505. In step 602, index data is extracted from the data file system, for example using index data extractor 506, and is stored in a database, for example in database 505. In a test step 603, it is verified if an access to the metadata file system 32 is requested by a user and/or an application. If access is requested, step 604 is executed, where access to the metadata file system 32 is given, using for example metadata file system builder 503. Then, the algorithm iterates test step 603, illustrated by arrow 610. If no access to the metadata file system 32 is requested, test step 606 is executed, where it is verified if an access to the view file system 40 is requested by a user and/or application. If access is requested, step 607 is executed, where access to the view file system 40 is given, using for example view file system builder 502. Then, the algorithm reiterates test step 603, illustrated by arrow 609. If no access to view file system is requested, the algorithm again returns to test step 603, illustrated by arrow 608.

According to a particular embodiment of the invention, steps 603-604 of testing and giving access to metadata file system and steps 606-607 of testing and giving access to view file system are executed in a parallel manner, giving simultaneous access to the metadata file system and to the view file system. According to a particular embodiment, step 601 of extraction of metadata is executed when metadata is modified in step 604 of giving access to metadata file system, so that the metadata stored in database 505 is kept updated.

The invention claimed is:

1. A method of managing data files stored in a data file system implemented by a file management device, said method comprising:
   creating a metadata file system for storing metadata related to said data files stored in said data file system;
   organizing said metadata file system according to a structure of said data file system;
   creating a view file system for organizing said data files in said data file system according to said metadata stored in said metadata file system; and
   organizing said data files of said data file system using said view file system, according to said metadata stored in said metadata file system, in at least one directory of said view file system which directory comprises as content at least one pointer to at least one of said data files in said data file system, said content being determined according to at least one metadata selection criterion, and wherein said data file system, said metadata file system and said view file system are mounted on a same root file system level, and wherein said data file system stores said data files, said metadata file system stores metadata related to said data files, and said view file system stores pointers to said data files.

2. The method according to claim 1, further comprised of accessing said metadata file system and said view file system using methods for accessing said data file system.

3. The method according to claim 1, further comprised of:
   representing at least one of said data files in said data file system as at least one directory in said metadata file system;
   representing at least one metadata attribute related to said at least one of said data files in said data file system, as at least one file in said metadata file system; and
   representing at least one value of said at least one metadata attribute as being stored in said at least one file in said metadata file system.

4. The method according to claim 1, wherein said at least one metadata selection criterion is comprised in at least one configuration file that is accessible to at least one client device in said view file system in a subdirectory having a name identifying said at least one metadata selection criterion.

5. The method according to claim 4, wherein said at least one configuration file comprises a metadata selection criterion that is represented by a metadata attribute and a metadata attribute value.

6. The method according to claim 4, wherein said at least one configuration file comprises a metadata sorting criterion that is represented by a metadata attribute.

7. A hardware device for managing data files stored in a data file system, said device comprising:
   a metadata file system builder, implemented by a computer processor, for creating a metadata file system for storing metadata related to said data files stored in said data file system, and for organizing said metadata file system according to a structure of said data file system;
   a view file system builder, implemented by a computer processor, for creating a view file system for organizing said data files in said data file system according to said metadata stored in said metadata file system; and
   said view file system organizing said data files of said data file system according to said metadata stored in said metadata file system in at least one directory of said view file system which directory comprises as content at least one pointer to at least one of said data files in said data file system, said content being determined according to at least one metadata selection criterion, wherein said data file system, said metadata file system and said view file system are mounted on a same root file system level, and wherein said data file system stores said data files, said metadata file system stores metadata related to said data files, and said view file system stores pointers to said data files, and wherein said metadata file system is configured for accessing using same access methods used for accessing said data file system, for changing of a directory, listing contents of a directory, and reading file contents.

8. The device of claim 7, wherein said device further comprises a database stored in memory, comprising data used by said metadata file system builder and used by said view file system builder.

9. A method of accessing files stored in file systems implemented by a file management device, said method comprising:
   creating a metadata file system for storing metadata related to said data files stored in said data file system;
   organizing said metadata file system according to a structure of said data file system;
   creating a view file system for organizing said data files in said data file system according to said metadata stored in said metadata file system; and
   organizing said data files of said data file system using said view file system, according to said metadata stored in said metadata file system, in at least one directory of said view file system which directory comprises as content at least one pointer to at least one of said data files in said data file system, said content being determined according to at least one metadata selection criterion, and wherein said data file system, said metadata file system and said view file system are mounted on a same root file system level, and wherein said data file system stores said data files, said metadata file system stores metadata related to said data files, and said view file system stores pointers to said data files;

and accessing said metadata file system using same access methods as for accessing said data file system, for changing of a directory, listing contents of a directory, and reading file contents.

10. A device for managing data files stored in a data file system, said device comprising:

a metadata file system builder, implemented by a computer processor, for creating a metadata file system for storing metadata related to said data files stored in said data file system, and for organizing said metadata file system according to a structure of said data file system;

a view file system builder, implemented by a computer processor, for creating a view file system for organizing said data files in said data file system according to said metadata stored in said metadata file system; and said view file system organizing said data files of said data file system according to said metadata stored in said metadata file system in at least one directory of said view file system which directory comprises as content at least one pointer to at least one of said data files in said data file system, said content being determined according to at least one metadata selection criterion, wherein said data file system, said metadata file system and said view file system are mounted on a same root file system level, and wherein said data file system stores said data files, said metadata file system stores metadata related to said data files, and said view file system stores pointers to said data files, and wherein said metadata file system is configured for accessing using same access methods used for accessing said data file system, for changing of a directory, listing contents of a directory, and reading file contents.

11. The device according to claim 8, wherein said at least one metadata selection criterion is comprised in at least one configuration file that is accessible to at least one client device in said view file system in a subdirectory having a name identifying said at least one metadata selection criterion, said at least one configuration file being stored in memory of said device.

12. The device according to claim 11, wherein the at least one configuration file stored in memory of the device comprises a metadata selection criterion that is represented by a metadata attribute and a metadata attribute value.

13. The device according to claim 11, wherein said at least one configuration file stored in memory of the device comprises a metadata sorting criterion that is represented by a metadata attribute.

14. The device according to claim 10, wherein said at least one metadata selection criterion is comprised in at least one configuration file that is accessible to at least one client device in said view file system in a subdirectory having a name identifying said at least one metadata selection criterion, said at least one configuration file being stored in memory of said device.

15. The device according to claim 14, wherein the at least one configuration file stored in memory of the device comprises a metadata selection criterion that is represented by a metadata attribute and a metadata attribute value.

16. The device according to claim 14, wherein said at least one configuration file stored in memory of the device comprises a metadata sorting criterion that is represented by a metadata attribute.

17. The device according to claim 10, wherein the device further comprises a memory for storing a database, said database comprising data used by said metadata file system builder and by said view file system builder.

18. The method according to claim 9, wherein said at least one metadata selection criterion is comprised in at least one configuration file that is accessible to at least one client device in said view file system in a subdirectory having a name identifying said at least one metadata selection criterion.

19. The method according to claim 18, wherein said at least one configuration file comprises a metadata selection criterion that is represented by a metadata attribute and a metadata attribute value.

20. The method according to claim 18, wherein said at least one configuration file comprises a metadata sorting criterion that is represented by a metadata attribute.

* * * * *